(12) United States Patent
Weider et al.

(10) Patent No.: US 6,490,589 B1
(45) Date of Patent: Dec. 3, 2002

(54) SYSTEM AND METHOD FOR REWRITING QUERIES

(75) Inventors: Chris Weider, Everett, WA (US); Paul Leach, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/223,542

(22) Filed: Dec. 30, 1998

(51) Int. Cl.[7] .............................................. G06F 17/00
(52) U.S. Cl. ........................ 707/100; 709/200; 707/10
(58) Field of Search ................................ 709/200–207, 709/233–234, 313; 707/1–206; 711/200

(56) References Cited

U.S. PATENT DOCUMENTS

| | | | |
|---|---|---|---|
| 5,491,817 A | | 2/1996 | Gopal et al. ................. 707/200 |
| 5,907,837 A | * | 5/1999 | Ferrel et al. .................... 707/3 |
| 6,061,692 A | * | 5/2000 | Thomas et al. ............. 707/200 |
| 6,119,167 A | * | 9/2000 | Boyle et al. ................. 709/234 |
| 6,161,130 A | * | 12/2000 | Horvitz et al. .............. 709/206 |
| 6,185,598 B1 | * | 2/2001 | Farber et al. ................ 709/234 |

OTHER PUBLICATIONS

Zhao et al. "mSLP–mesh–enhanced service location protocol", Computer Communications and Networks, 2000, Proceedings, Ninth International Conference on, pp. 504–509, Oct. 2000.*

Chuso et al., "FACL: a form–based agent communication language for enduser–initiative agent–based application development", Comuter Software and Applications Conference, 2000, The 24th Annual International, pp. 139–148, Oct. 2000.*

Bramley et al., "A component based services architectue for building distributed applications", High–Performance Distributed Computing, 2000, Proceedings, The Ninth International Symposium on, pp. 51–59, Aug. 2000.*

SURFnet, "2. Introduction to Internet Directory Services", Introducing a Directory Service, Last updated 1997, http://www.surfnet.nl/innovatie/afgesloten/x500/introducing/chapt–2.html, 8 pages.* www.dante.net, "Requirements for the future NameFLOW Directory Service", http://www.dante.net/np/requirements.html, 8 pages, Jul. 1998.*

Leach, P.J. et al., "Query Routing: Applying Systems Thinking to Internet Search," *Proceedings. The Sixth Workshop on Hot Topics In Operating Systems*, May 5–6, 1997, pp. 82–86. *IEEE Comput. Soc. Press.*

Ordille, J.J. et al., "Nomenclator Descriptive Query Optimization for Large X.500 Environments," *Computer Communications Review, U.S. Association for Computer Machinery*, New York, vol. 21, No. 4, pp. 185–196, 1991.

Bruno, L., "Tie It All Together. Directories Have Grown in Complexity and Size—But There Are Ways To Control the Chaos," *Data Communications, U.S., McGraw Hill. New York*, vol. 26, No. 3, pp. 75–78; 80; 82–83, 1997.

(List continued on next page.)

*Primary Examiner*—David Jung
(74) *Attorney, Agent, or Firm*—Woodcock Washburn LLP

(57) ABSTRACT

A distributed directory service includes data sources (DS#1 through DS#5), index servers (IS#1, IS#2 and IS#3) and a client. The data sources generate an index of their data as well as a listing of their schema and a mapping from their schema to their index server's schema. This information is then transmitted to the index server for each data source, which repeats the process by providing an index and mapping information to its index server(s), if any.

18 Claims, 6 Drawing Sheets

OTHER PUBLICATIONS

Hunt, R., "CCITT X.500 Directories—Principles and Applications" *Computer Communications*, NL, Elsevier Science Publishers B.V., Amsterdam, vol. 15, No. 10, pp. 636–645, 1992.

Deutsch et al., "Architecture of the WHOIS++ Service," Aug. 1995, 52 pages.

Faltstrom et al., "How to Interact with a WHOIS++ Mesh," Feb. 1996, 13 pages.

Weider et al. "Architecture of the WHOIS++ Service," Feb. 1996, 21 pages.

Weider, C. et al., "Hierarchical Extensions to the Common Indexing Protocol", Internet–Draft of the Internet Engineering Task Force (IETF), Nov. 25, 1996, 1–14.

* cited by examiner

SYSTEM AND METHOD FOR REWRITING QUERIES

CROSS REFERENCE TO RELATED APPLICATIONS

The subject matter disclosed herein is related to the subject matter disclosed in commonly assigned U.S. patent application Ser. No. 09/223,360, filed on even date herewith, entitled "System and Method for Generating Hierarchical Forward Knowledge."

TECHNICAL FIELD

The present invention relates generally to methods and systems for use in providing services in a distributed information system, and more particularly to methods for formulating queries in a distributed directory service.

BACKGROUND OF THE INVENTION

A directory service component of a distributed computing environment is intended to make it easier to find information. It provides the information necessary to access a person or resource. For example, a directory service permits administrators, users and applications to find information about people, printers, files and other shared resources in a single place even if the resources reside on many different physical servers. The directory may be viewed as a database of information about objects, including people, organizations and processes.

In massively distributed information systems, it can be extremely expensive and in some cases impossible to centrally index all the information from the large number of information sources available. One of two strategies is typically employed to conduct a search that covers the contents of large numbers of information sources. These strategies are 'query flood' and 'query routing.'

Query flood requires the client to talk to each source in some subset of the system, whether or not that source has any relevant data. The subset of the system searched is selected by picking a location in the global hierarchical namespace and searching the sources whose names are 'children' of the location picked. The query flood strategy can be prohibitively expensive.

Query routing, on the other hand, uses hierarchies of indexes to allow queries to be directed to only those sources having information that may fulfill the query. For most types of information, this means that the client has to contact far fewer sources than before.

The present invention provides improvements to query routing methods and systems, such as the Common Indexing Protocol (CIP) used in the WHOIS++ directory service. For background on this work, see Deutsch, et al., "Architecture of the WHOIS++ Service," August 1995; Faltstrom, et al., "How to Interact With a WHOIS++ Mesh", February 1996; Weider, et al., "Architecture of the WHOIS++ Service," February 1996; and Weider, et al., "Hierarchical Extensions to the Common Indexing Protocol," November 1996. Although the background of the present invention is explained below in connection with the WHOIS++ directory service, it should be noted that the invention is by no means limited thereto.

The WHOIS++ Directory Service

With the vast amount of directory information potentially available, e.g., on the Internet, it is not feasible to provide a centralized directory to serve all this information. Instead of being centralized, the WHOIS++ directory service is 'distributed' in that it is based on a hierarchy of directory information collection agents. In this architecture, a directory query is delivered to an agent in the tree, and then handed up or down, as appropriate, so that the query is delivered to the agent that holds the information that fills the query.

One of the primary assumptions made by recent implementations of distributed directory services is that every entry in the directory resides in some location in a hierarchical name space. While this arrangement is ideal for reading the entry once its location is known, it is not as good when searching for the location of those entries that meet some set of criteria. If the only criteria known about a desired entry are items that do not appear in the namespace, a global query is required. Whenever a global query (at the root of the namespace) or a query at the top of a subtree in the namespace is issued, that query is replicated to all subtrees of the starting point. The replication of the query to all subtrees is not necessarily a problem, since the queries may be inexpensive. However, every server to whom the query has been replicated must process that query, even if it has no entries matching the specified criteria. This part of global query processing is quite expensive.

The WHOIS++ directory service addresses these problems by a combination of two techniques: directory meshes and forward knowledge. Although every entry in WHOIS++ does have a unique identifier (i.e., it resides in a specific location in the namespace), the navigational algorithms to reach a specific entry do not necessarily depend on the identifier assigned to the entry. The WHOIS++ service gets around the namespace and hierarchy problems by creating a directory mesh on top of the entries. Each layer of the mesh has a set of 'forward knowledge' that indicates the contents of the various servers at the next lower layer of the mesh. Thus, when a server in a particular layer of the mesh receives a query, it can prune the search tree and hand the query off to only those lower level servers that have indicated they might be able to answer it. Searching thus becomes feasible at all levels of the mesh.

Most directory services use a basic 'template-based' information model, in which each entry consists of a set of attribute-value pairs. To participate in the index service, the underlying database should be able to generate a 'centroid' or some other type of forward knowledge for the data it serves. The so-called centroid of a server may include a list of the templates and attributes used by that server, and a word list for each attribute. The word list for a given attribute could contain, e.g., one occurrence of every word appearing at least once in that attribute in some record in that server's data.

An index server collects and collates the centroids of either a number of base data servers or a number of other index servers. It is able to generate a centroid for the information it contains. In addition, when it receives a query, the index server searches its collections of centroids, determines which servers hold records that may fill that query, and then notifies the user's client of the identities of the servers to which the query should be submitted next. An index server can also contain primary data and thus act as both an index server and a base level server. In this case, the index server's response to a query may be a mix of records and referral pointers.

Shortcomings of the Prior Art

Both the query flood and query routing search strategies, in their present form, have shortcomings in both time and resource efficiencies. For example, the protocols used to create and query the hierarchies of indexes implicitly assume that the query issued to each index (and to the data sources) is the same in each case. The present disclosure addresses this problem by disclosing ways to permit index servers to 'rewrite' the query to be sent to the next source down in the hierarchy. In contrast to the present invention, previous referral-based systems simply told the client which server to contact next when resolving a query, but not how to rewrite the query.

Moreover, the present invention is directed to methods and systems for generating the forward knowledge, or indexes, employed in a distributed directory service. As indicated above, the concept of using forward knowledge to efficiently route queries in a distributed directory service was disclosed in the work documenting the WHOIS++ directory service. However, particular methods and systems for generating such forward knowledge were not developed in the prior work.

SUMMARY OF THE INVENTION

Accordingly, the present invention is directed to a method and system for operating a distributed computer system such as, e.g., a distributed directory service. The system preferably includes a plurality of index servers and a plurality of data sources. The inventive method involves generating information indicative of a mapping of the schema of each data source to the schema of its corresponding index server. The mapping information for each data source is provided to its index server. Upon receiving a query from a client at a particular index server, the mapping information for a selected data source is used to rewrite the query, and the rewritten query is provided to the client. Typically, the mapping information will be provided to the client along with a referral to the selected data source (the 'referee'). The client may then use the referral to submit the rewritten query to the referee. Moreover, the rewritten query is formulated so as to be compatible with the schema used by the referee. Preferably, it is also formulated so as to omit any attribute that is not part of the schema of the referee.

Other features of the invention are described below.

DETAILED DESCRIPTION OF PREFERRED EMBODIMENTS

Prior to explaining the details of preferred embodiments of the invention, an exemplary environment in which the present invention may be implemented will be described. The exemplary environment is described below in terms of a single computer and a computer network.

Exemplary Operating Environment

1. Computer Environment

Figure 1:
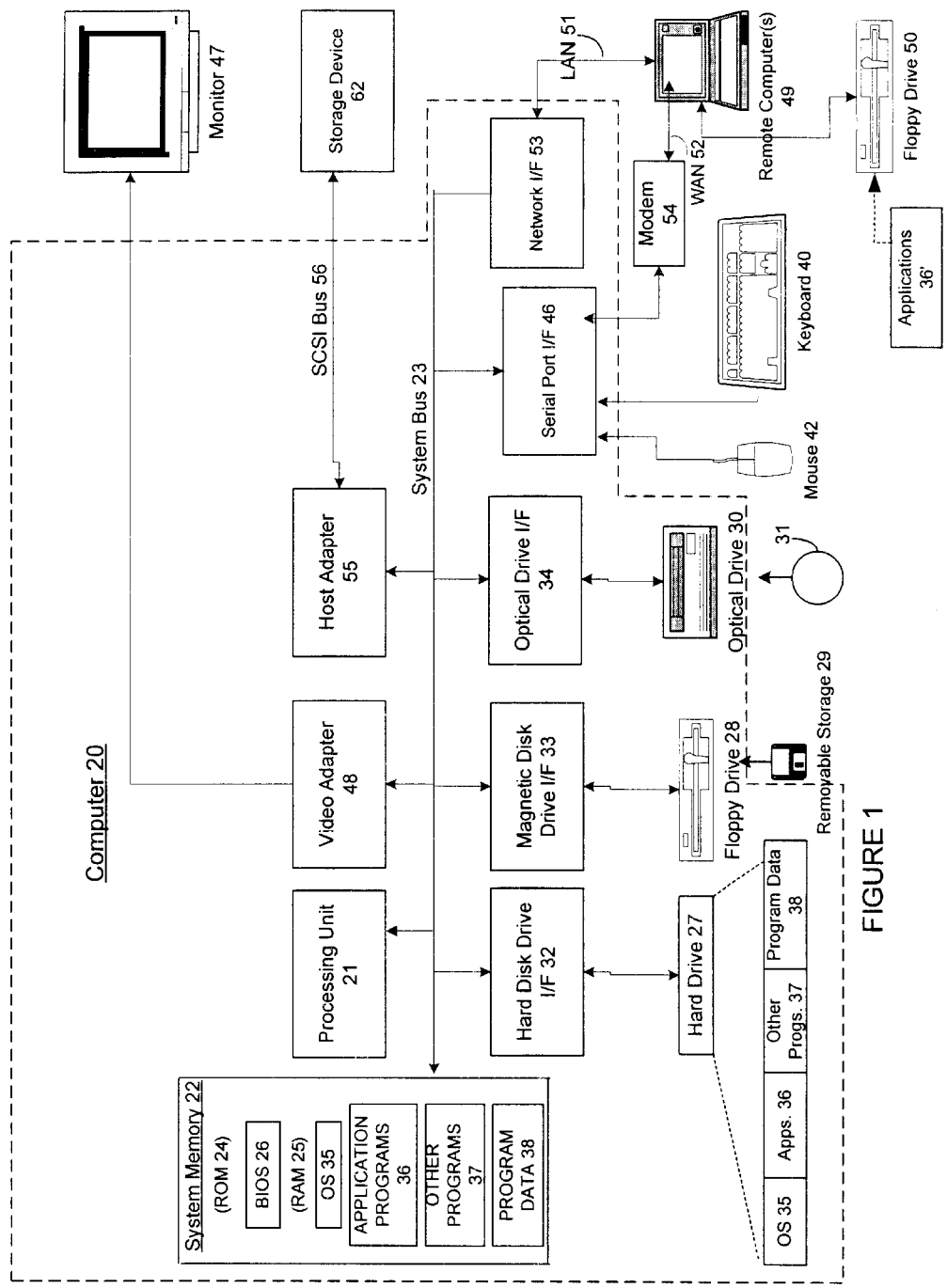
FIG. 1 is a block diagram representing a computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a workstation or server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data, such as magnetic cassettes, flash memory cards, digital video disks, Bernoulli cartridges, random access memories (RAMs), read-only memories (ROMs) and the like, may also be used. Further, as used herein, the term "computer readable medium" includes one or more instances of a media type (e.g., one or more floppy disks, one or more CD-ROMs, etc.).

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

2. Network Environment

As noted, the computer described above can be deployed as part of a computer network. In general, the above description applies to both server computers and workstation computers deployed in a network environment.

Figure 2:
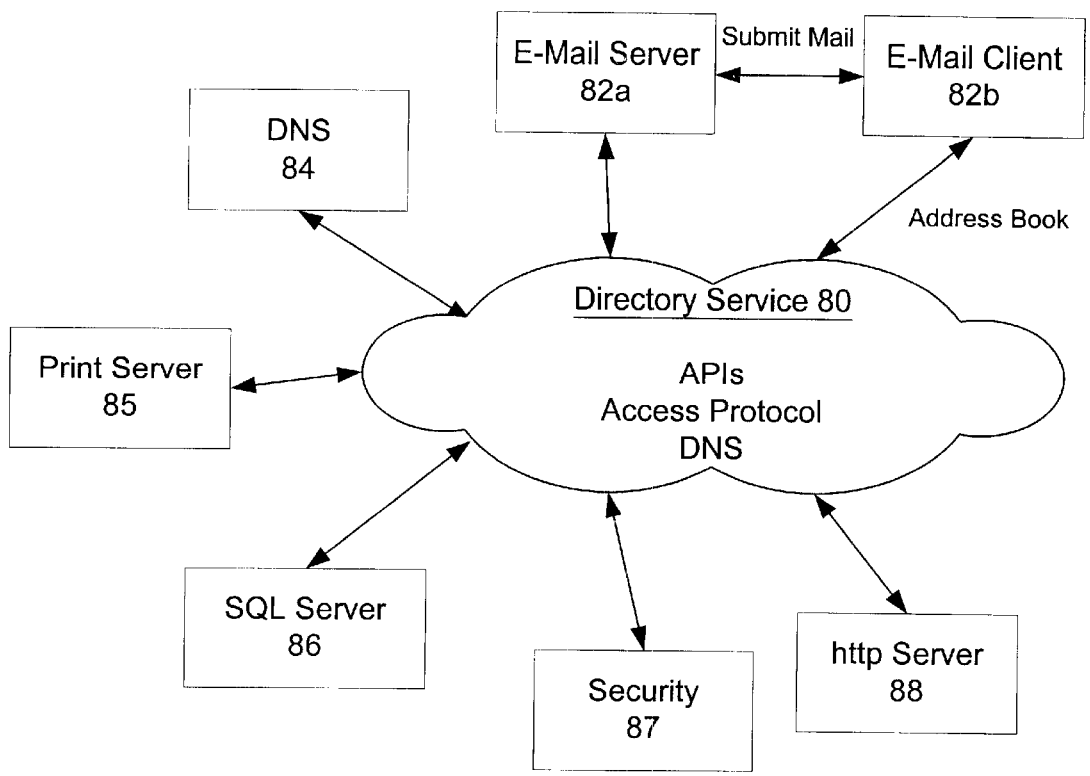
FIG. 2 schematically depicts a directory service in a network environment.

FIG. 2 schematically depicts how a directory service 80 provides a logically centralized location for finding shared resources. Such shared resources may include, e.g., an e-mail server 82a or address book for use by an e-mail client 82b, the Domain Name System (DNS) 84 (the locator service used on the Internet), a print server 85, a database (e.g., SQL) server 86, a security server 87, and an http server 88. One protocol for directory access is the industry-standard LDAP (Lightweight Directory Access Protocol), which allows for extensive interoperability with directory services from multiple sources. The directory service 80 insulates users and administrators from having to navigate the physical structure of the network.

The directory service 80 may make use of the features of DNS and the OSI X.500 directory standard (also known as ISO 9594). For example, since DNS may be used as a global backbone namespace, the directory service may use DNS to look up LDAP services. In addition, multiple application programming interfaces (APIs), such as MAPI and LDAP C may be employed to facilitate the writing of directory-enabled applications that access the directory.

A directory of the kind provided by the directory service 80 is, or may be viewed as, a namespace, i.e., a bounded area in which a given name can be resolved. Name resolution is the process of translating a name into some object or information that the name represents. For example, a telephone book forms a namespace in which the names of telephone subscribers can be resolved to telephone numbers. Likewise, the directory service 80 provides a namespace in which the name of an object (also referred to herein as an "entry") in the directory can be resolved to the object itself. (An "object" is a distinct, named set of attributes that represents something concrete, such as a user, a printer, or an application. The attributes hold data describing the thing that is identified by the directory object. Attributes of a user might include the user's given name, surname, and e-mail address.)

Figure 3:
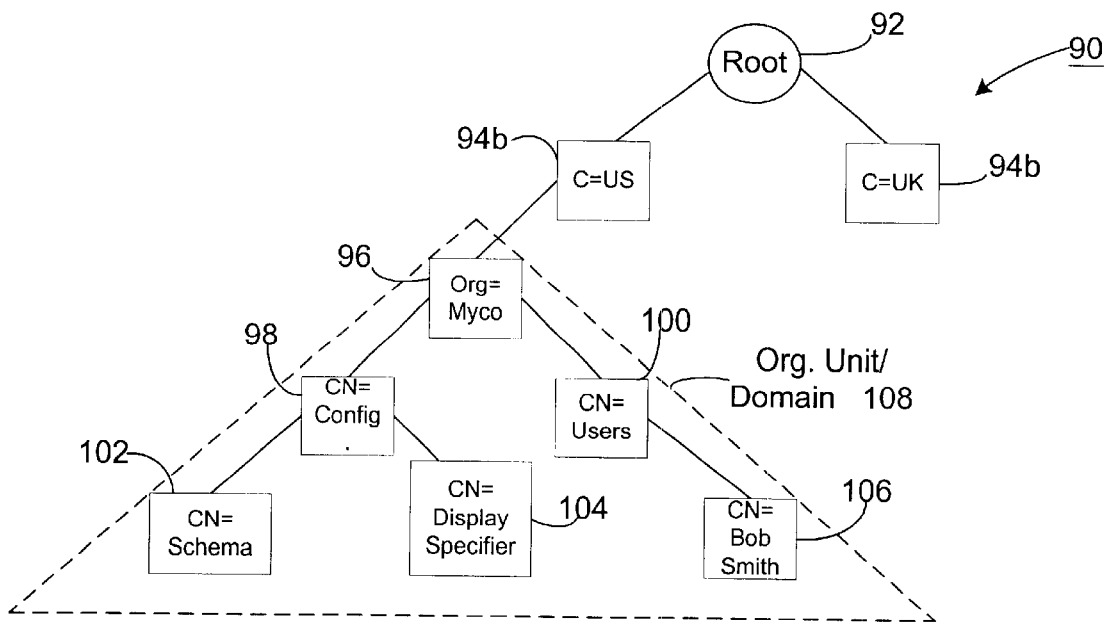
FIG. 3 is a directory tree diagram showing further details of the arrangement of the directory service of FIG. 2.

FIG. 3 depicts an exemplary hierarchical namespace 90. This namespace includes a root 92 and a tree comprising a hierarchy of objects and containers. (A container is like an object in that it has attributes and is part of the namespace. However, unlike an object, it does not represent something concrete. It is used to hold or organize a group of objects and/or other containers.) Endpoints on the tree are usually objects. Nodes or branches are containers. A tree shows how objects are connected or the path from one object to another. A simple directory is a container. A computer network or domain is also a container. The namespace of FIG. 3 includes two country nodes 94a and 94b (corresponding to country=U.S. and country=U.K., respectively), and a sub-tree under node 94a comprising nodes 96 (organization= Myco); nodes 98 and 100 (common name=Config. and common name=Users, respectively); and nodes 102, 104 and 106 (common name=Schema, common name=Display Specifier and common name=BobSmith, respectively). As indicated in FIG. 3, node 96 and its children nodes may be viewed as an organizational unit 108, which is also called a "domain." The organizational unit/domain is served by a closely coupled set of servers, or domain controllers.

Generating Hierarchical Forward Knowledge

The present invention provides a method and system for generating an index of data, or forward knowledge, to be provided by data sources or lower level index servers to higher order index servers. The invention is especially suited for use in connection with a distributed directory service comprising a hierarchical arrangement of data sources, data servers and index servers.

Figure 4A:
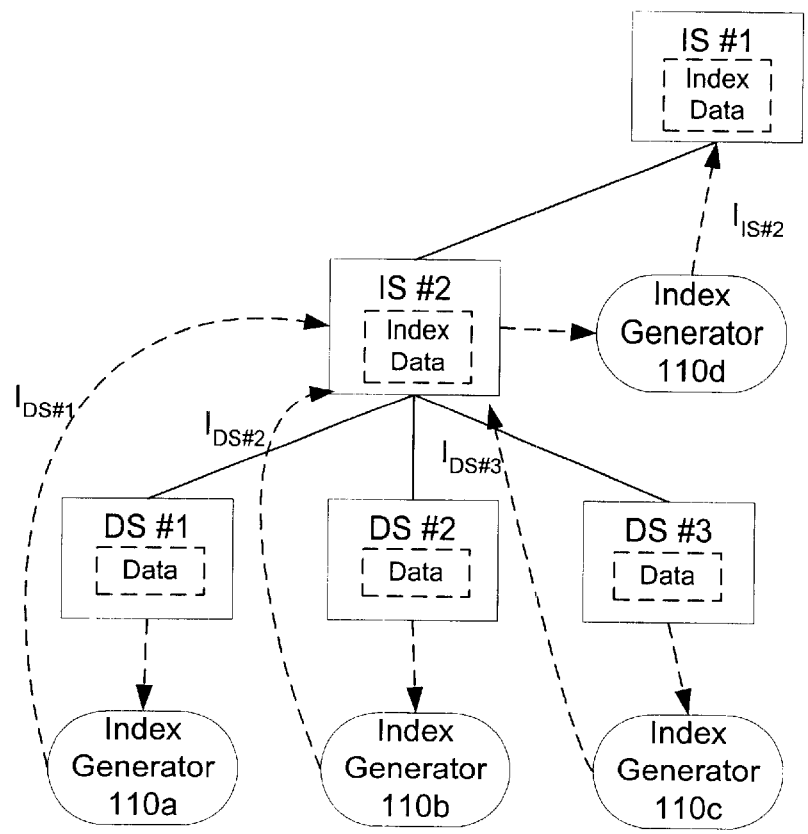
FIGS. 4A and 4B depict a system and method for generating hierarchical forward knowledge in accordance with the present invention.

As shown in FIG. 4A, the present invention is preferably employed in association with a distributed computer system or directory service that includes data sources (denoted DS#1 through DS#3) and index servers (IS#1 and IS#2). Each data source contains data for which an index may be generated as described in greater detail below. The example shown in FIG. 4A includes index generators 110a, 110b and 110c for use by data sources DS#1, DS#2 and DS#3, respectively. As shown, index generator 110a creates an index, denoted IDS#1 in FIG. 4A, that is provided to index server IS#2 and stored therein in a computer readable storage medium. Similarly, indexes $I_{DS\#2}$ and $I_{DS\#3}$ are formed by index generators 110b and 110c, respectively, and then provided to index server IS#2. Each index is formed such that it will meet the criteria of (a) producing no false negatives when queried (i.e., when queried, it will not indicate that certain data is not present when in fact it is) and (b) comprising less data than the data to be indexed. (If the index requires the same or more storage space than the original data, there would be no advantage in forming the index, i.e., a complete copy of the underlying data could just as well be provided to the index server (step S4 in FIG. 4B).)

In addition, it is preferable to form the index such that it also meets the requirement of producing a minimal number of false positives (i.e., indicating that a particular data source has data that will fulfill a query when in fact it does not). The present invention does not require that the false positives criterion be measured in any specific way or that it be limited to any specific maximum value. Nonetheless, it may be helpful to state that this requirement can be measured or quantified in at least two ways: The first is to borrow some terms from the Information Retrieval community, and talk about recall and precision. Recall is how many of the relevant things do you get from the system and precision is how much irrelevant information do you get. We can therefore quantify the false positives in terms of recall and precision in the system. The second way to quantify this is to note that, with perfect routing information, there will be zero false positives. We could then measure the false positives for a query Q as:

FP (Q)=(# of referrals which do not lead to relevant resources)/(# of total referrals made by the system).

Figure 4B:
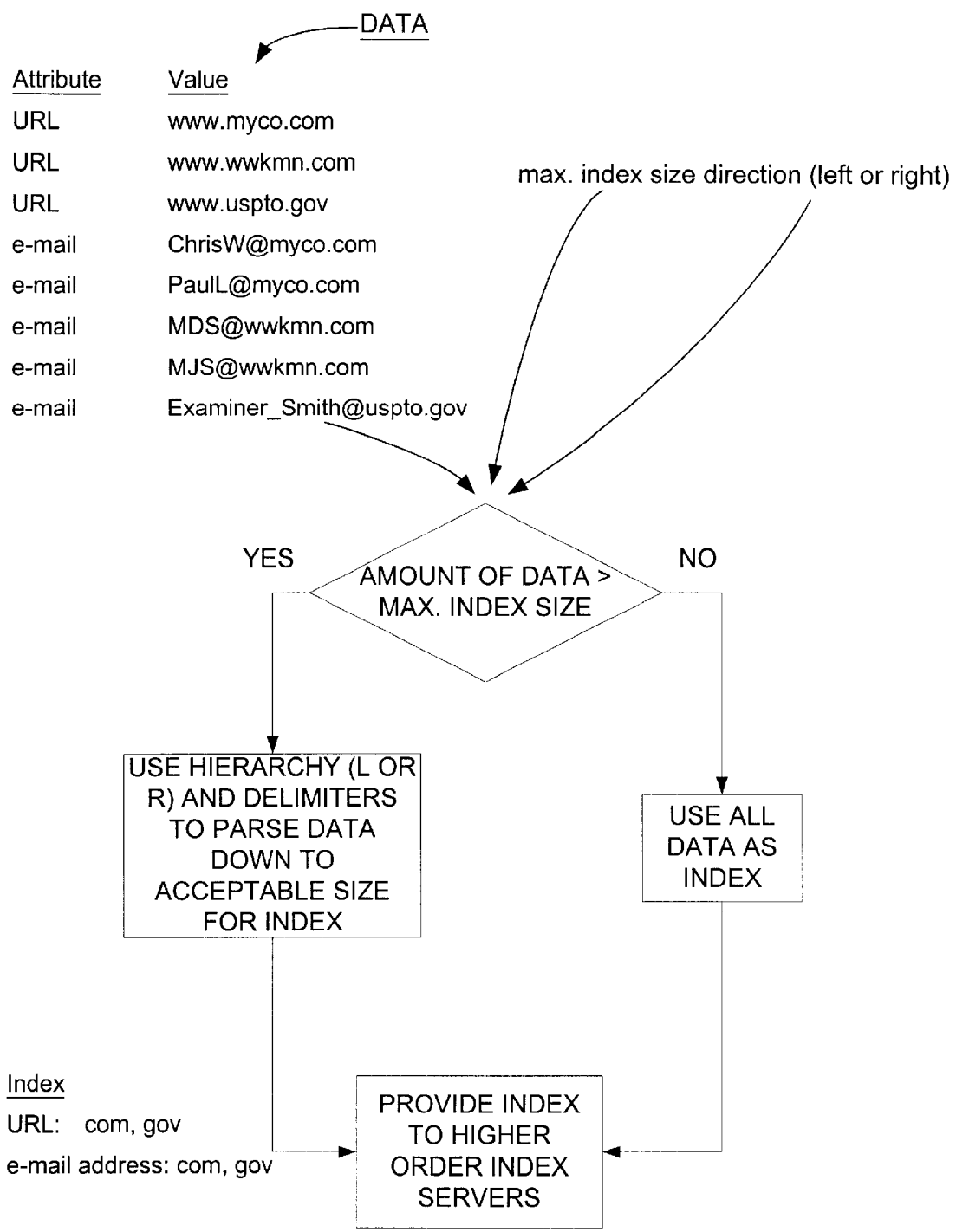

As illustrated in FIG. 4B, the inventive method involves determining the amount of data to be indexed, and comparing the amount of data to be indexed to a predefined maximum index size (step S1 in FIG. 4B). If the amount of data to be indexed is greater than the maximum index size, an index of reduced size is generated (step S2), and then this index is provided to higher order index servers in the hierarchical configuration of data sources, data servers and index servers (step S3).

According to the invention, the index is formed by parsing the data in accordance with a prescribed data hierarchy (e.g., left or right) and using portions of the data while omitting other portions of the data. The parsing (step S2) is preferably carried out in accordance with prescribed delimiters or separators (such as a period ("."), a space (" ") or at sign ("@")) contained in the data to be indexed. For example, a data source might contain the Universal Resource Locators (URLs) and e-mail addresses listed below and shown in FIG. 4B. These records are formed in a hierarchical structure with different levels of the hierarchy separated by delimiters.

| Attribute | Value |
|---|---|
| URL | www.myco.com |
| URL | www.wwkmn.com |
| URL | www.uspto.gov |
| e-mail | ChrisW@myco.com |
| e-mail | PaulL@myco.com |
| e-mail | MDS@wwkmn.com |
| e-mail | MJS@wwkmn.com |
| e-mail | Examiner_Smith@uspto.gov |

The parsing of the data on the right hand side of the above attribute-value pairs would proceed from left to right, since the data is assumed or defined to be graded in ascending order from left to right, and an exemplary index as shown below would be created. The present invention performs 'semantic' or 'hierarchical' compression to form the index. The smallest index that can be created (other than the null index) is:

URL: com, gov e-mail: com, gov.

The next smallest index takes two components from each attribute, for

URL: myco.com, wwkmn.com, uspto.gov e-mail: myco.com, wwkmn.com, uspto.gov.

This can obviously be modified to optimize the size of the entire index for the data source.

It will be apparent to those skilled in the computer programming art that the data sources and index servers of a distributed computer system may be programmed in a variety of ways to generate an index in accordance with the above-described procedure. One example of pseudocode for carrying out the inventive procedure is set forth below.

Determine Hierarchy (left or right);
Determine hierarchy delimiters (in our example above, the delimiters are '@' and '.');
Set variable-number-of-components=0;
While (index-size<max-index-size) do
    Increment variable-number-of-components;
    Index-size=(Compute size of index given variable-number-of-components);
End while.

Query Rewrite

Figure 5:
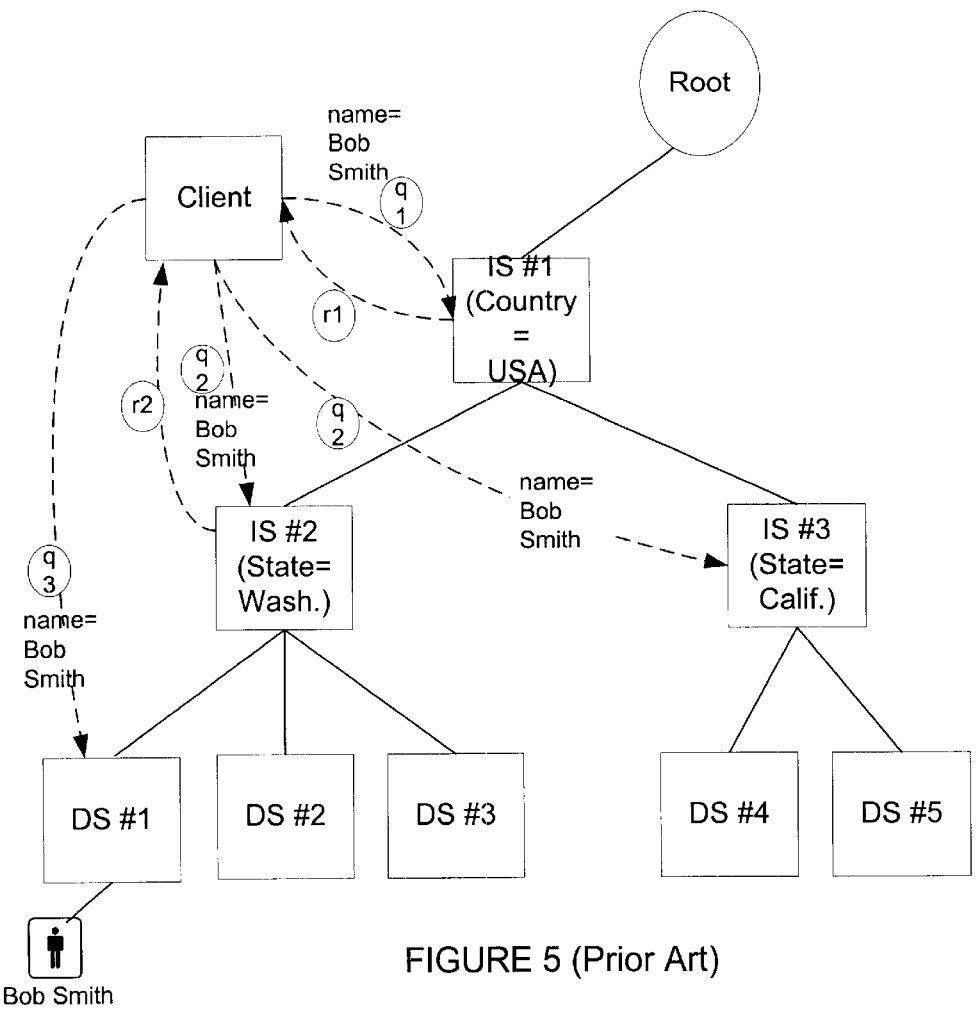
FIG. 5 illustrates the operation of a query routing process in accordance with the prior art.
Figure 6:
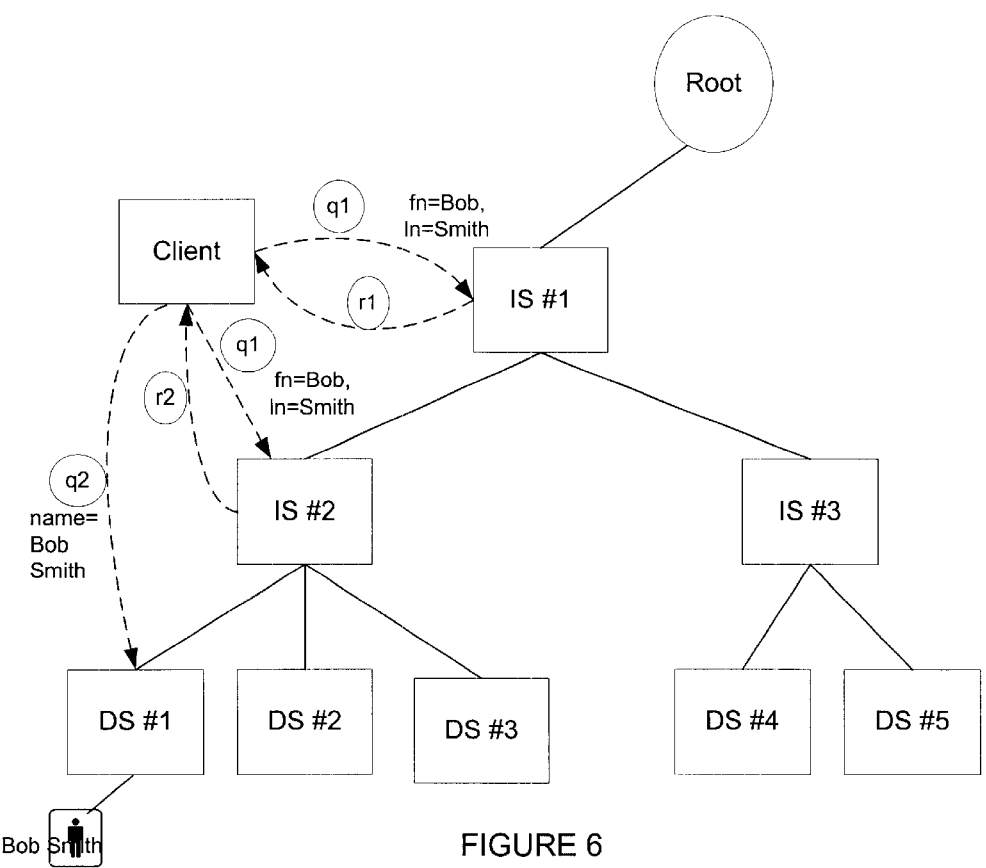
FIG. 6 illustrates a query routing process in accordance with the present invention.

A preferred method of operation of a system in accordance with the present invention is described next. As shown in FIGS. 5 and 6, a distributed computer system or directory service includes data sources (DS#1 through DS#5), index servers (IS#1, IS#2 and IS#3, where IS#2 and IS#3 may be called "base level" index servers since they are closest to the base data sources), and a client. Previous referral-based systems, such as the X.500, simply told the client which server to contact next when resolving a query. Such systems could not tell a client how to rewrite a query, e.g., to match the schema of the server or data source to which the query was to be submitted, because they did not have the information necessary to guide the rewrite. However, the indexes provided in accordance with the present invention enable the index servers to rewrite the query based on the source(s) to which the query is to be routed.

As shown in FIG. 5, in the X.500 or LDAP model, a client issues a query (q1) to a selected index server for entry "BobSmith", say USA server (IS#1). The USA server might issue a referral (r1) to the client, in which the client is told to contact state servers for Washington and California (IS#2 and IS#3). The client would then resubmit the same query (q2 in FIG. 5) to the state servers IS#2 and IS#3 and receive a referral (r2) to the data sources. Assume that one of the data sources (DS#1 through DS#5) can fulfill the query. Thus, the client is required to submit a query to each of the three index servers (IS#1, IS#2 and IS#3) plus a query to each of the five data sources (DS#1 through DS#5) before one of the data sources fulfills the query. In this example, then, the client has to submit a total of eight queries before retrieving the entry "BobSmith." Note also that the client must have accurate knowledge of the schema of the data source in order to accurately query for the "BobSmith" entry. For example, the client must know the schema for the data source has an attribute of the type "name" in order to form the query "name=BobSmith."

Referring to FIG. 6, according to the present invention, the number of referred queries is reduced and the client does not have to have accurate knowledge of the data source schema. The data sources generate an index of their data, as described above, as well as a listing of their schema and, preferably, a mapping from their schema to their index server's schema. This information is then transmitted to the index server for each data source, which repeats the process by providing an index and mapping information to its index server(s), if any. The system operates as follows: The client issues a query (q1, e.g., "fn=Bob, ln=Smith") to an index server, say IS#1. The client's request will typically use the index server's schema. The index server will then issue a referral (r1) to a given data source or index server, say IS#2. The index server does this by querying the index it has for each of the data sources within its purview, and determining which data source(s) might be able to fulfill the query. In this example, the index information available to IS#2 reveals that data source DS#1 is the only data source that might fulfill the query. Index server IS#2 compares the incoming query to the schema of the data source, rewrites the query as necessary (e.g., by changing the query "fn=Bob, ln=Smith" to "name=Bob Smith"), and informs the client of the correct rewritten query as a part of the referral (r2) it returns. The client then issues a new query (q2: "name=Bob Smith") to the one data source, in this case DS#1, that might fulfill it. Therefore, in this example, the present invention reduces the number of queries issued by the client from eight to three.

Another aspect of the present invention relates to 'virtual attributes.' If the data located on a particular data source has a relationship to some other information that is not included in the schema of the data source, a higher order server, upon receiving a query seeking data which has the relationship implied in the data source, detects this situation via the forwarded compressed index and is thereby able to determine that despite the absence of the item in the data source's schema, the query ought to be forwarded to the data source and re-written without the limitation to the implied relationship.

For example, suppose the query (q1) submitted to server IS#2 is "name=Bob Smith and state=washington". If index server IS#2 knows that all of its data sources contain information about people residing in Washington, but that their schemas do not include an attribute for "state", it would rewrite the query to omit the "state=washington" limitation.

Another example is as follows: Suppose a higher level index server is acting as a 'topic' server. Server A indexes Server B; B is a directory site for Congresspeople, but the identifying information for each entry is 'Senator' or 'Representative'. Server B's index will thus contain the labels 'Senator' or 'Representative' but will not contain the label 'Congressman' or 'Congresspeople'. Server A can use a thesaurus to recognize that Senators and Representatives are Congressmen and thus provide a virtual attribute for 'title=congressman'. Server A will then rewrite the query on referral to Server B.

In conclusion, the present invention provides an improved method for operating a distributed computer system, particularly to route queries efficiently in such a system. Although the distributed system is described herein as including "index servers" and "data sources," it should be noted that any particular index server might also function as a data source, i.e., it may contain data that may be searched for by, and provided to, a client. The opposite is also true, i.e., a data source could also function as an index server. As described, forward knowledge in the form of an index is generated for each data source and index server. In addition, a mapping of the schema of each data source or index server to the schema of a higher order index server is also provided. The mapping information for a selected data source/index server is used in rewriting queries, as necessary. The query may be rewritten by the client or by the index server to whom the query was first submitted. For example, the mapping information may be provided to the client along with a referral to a selected data source, in which case the client would rewrite the query and submit the rewritten query to the referee.

While the invention has been described and illustrated with reference to specific embodiments, those skilled in the art will recognize that modifications and variations may be made without departing from the principles of the invention as described above and set forth in the following claims.

We claim:

1. A method for operating a distributed directory service, the directory service including a plurality of index servers and a plurality of data sources, wherein each data source is coupled to at least one index server, comprising the steps of:

generating information indicative of a mapping of a schema of each data source to a schema of a corresponding index server;

providing mapping information for each data source to a corresponding index server;

upon receiving a query from a client at a particular index server, using the mapping information for a data source to rewrite the query; and providing a rewritten query to the client.

2. A method as recited in claim 1, further comprising providing to the client a referral to a referee data source, whereby the client may use the referral to submit the rewritten query to the referee data source.

3. A method as recited in claim 2, wherein the rewritten query is formulated so as to be compatible with the schema used by the referee data source.

4. A method as recited in claim 3, wherein the rewritten query is formulated so as to omit any attribute that is not part of the schema of the referee data source.

5. A method as recited in claim 4, wherein the index servers are arranged in a hierarchy comprising multiple levels including at least a base level, and wherein each data source is coupled to at least one base level index server.

6. A method for operating a distributed computer system, comprising the steps of:

providing a plurality of index servers arranged in a hierarchy comprising multiple levels including at least a base level;

providing a plurality of data sources, wherein each such data source is coupled to at least one base level index server;

generating an index for the data provided by each data source;

generating mapping information indicative of a mapping of a schema of each data source to a schema of a corresponding index server;

providing the index and mapping information for each data source to its corresponding index server; and upon receiving a query from a client at a particular index server, using the index information to identify a data source or other index server to which the client is to be referred, and using the mapping information for the referee to rewrite the query.

7. A method as recited in claim 6, further comprising providing a rewritten query to the client along with a referral to the referee.

8. A method as recited in claim 7, wherein the rewritten query is formulated so as to be compatible with the schema used by the referee.

9. A method as recited in claim 8, wherein the rewritten query is formulated so as to omit any attribute that is not part of the schema of the referee.

10. A method as recited in claim 8, wherein at least one of the data sources is also an index server.

11. A method as recited in claim 8, wherein at least one of the index servers is also a data source.

12. A system for use in a directory service, comprising an index server and a plurality of data sources coupled to the index server, wherein the index server includes a computer readable storage medium in which is stored mapping information indicative of a mapping of a schema of a data source to a schema of the index server; wherein the index server further includes means for, upon receiving a query from a client, using the mapping information for a data source to rewrite the query, and providing a rewritten query to the client.

13. A system as recited in claim 12, wherein the index server further comprises an index of the data stored by at least one data source, each such index being stored in the computer readable storage medium.

14. A system as recited in claim 13, wherein the index server further comprises means for using the index information to provide to the client a referral to a referee data source, whereby the client may use the referral to submit the rewritten query to the referee data source.

15. A system as recited in claim 14, wherein the rewritten query is formulated so as to be compatible with the schema used by the referee data source.

16. A system as recited in claim 15, wherein the rewritten query is formulated so as to omit any attribute that is not part of the schema of the referee data source.

17. A system as recited in claim 16, wherein the system comprises a plurality of index servers and a plurality of data sources, wherein the index servers are arranged in a hierarchy comprising multiple levels including at least a base level and each data source is coupled to at least one base level index server.

18. A method for operating a distributed directory service, the directory service including a plurality of index servers and a plurality of data sources, wherein each data source is coupled to at least one index server, comprising the steps of:

generating information indicative of a mapping of a schema of each data source to a schema of a corresponding index server;

providing mapping information for each data source to a corresponding index server;

upon receiving a query from a client at a particular index server, using the mapping information for a data source to rewrite the query; and providing a rewritten query to the client, wherein the rewritten query is formulated so as to omit any attribute that is not part of the schema of the referee data source.

* * * * *

UNITED STATES PATENT AND TRADEMARK OFFICE
CERTIFICATE OF CORRECTION

PATENT NO. : 6,490,589 B1
DATED : December 3, 2002
INVENTOR(S) : Chris Weider et al.

It is certified that error appears in the above-identified patent and that said Letters Patent is hereby corrected as shown below:

Column 6,
Line 55, delete "IDS#1" and insert -- $I_{DS\#1}$ -- therefor.

Signed and Sealed this

Seventeenth Day of June, 2003

JAMES E. ROGAN
*Director of the United States Patent and Trademark Office*